E. K. BAKER.
VEHICLE WHEEL.
APPLICATION FILED MAR. 20, 1912.

1,173,243.

Patented Feb. 29, 1916.

Witnesses.
Earl E Howe
Edward F. Wilson

Inventor:
Erle K. Baker
by
Andrew Gordon
Atty.

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

VEHICLE-WHEEL.

1,173,243.   Specification of Letters Patent.   Patented Feb. 29, 1916.

Application filed March 20, 1912. Serial No. 685,103.

*To all whom it may concern:*

Be it known that I, ERLE K. BAKER, a citizen of the United States, and a resident of Chicago, Cook county, Illinois, have invented certain new and useful Improvements in Vehicle-Wheels, of which the following is a full, true, clear, and exact description, such as will enable others skilled in the art to make and use the same.

My invention relates to improvements in automobile wheels and demountable rims therefor and constitutes a modification of the structure disclosed in my co-pending applications Serial No. 566,605, filed June 13, 1910 and Serial No. 636,693, filed July 3, 1911.

The object of this invention is to simplify the construction of such wheels and provide more symmetrical supports for the inner and outer sides of the demountable rim whereby the use of the ordinary felly band rim flanges may be avoided and the strain and distorting tendencies of the clamping devices shall be distributed evenly upon both sides of the wheel and rim.

Other detail objects of my invention will appear hereinafter.

My invention consists in a wheel provided with a demountable rim and a plurality of rim clamping devices each including opposed supporting and clamping wedges and operating means all as hereinafter described and claimed.

Figure 1:
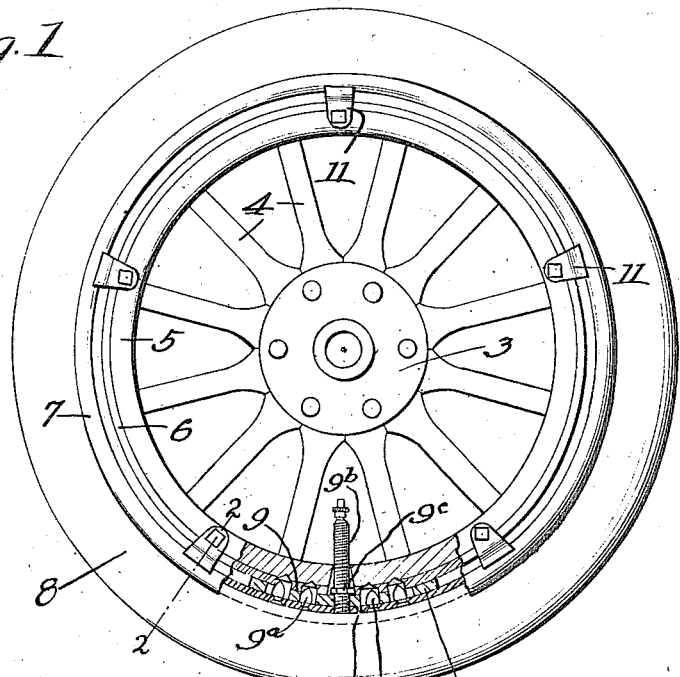
Figure 2:
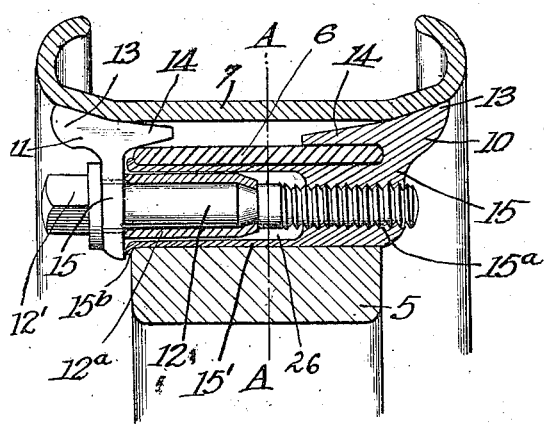
Figure 3:
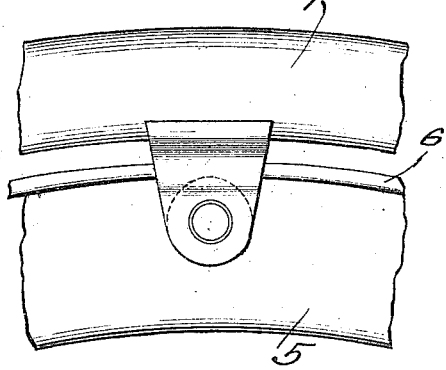

My invention in a preferred form is disclosed in and will be readily understood upon reference to the accompanying drawings forming a part of this specification and in which:

Figure 1 is a side view of an automobile wheel, rim and mounting embodying my invention; Fig. 2 is an enlarged sectional view of the rim, the felly, the felly band and supporting and clamping means, as on the line 2—2 of Fig. 1; and, Fig. 3 is a face view taken from Fig. 2 and showing the shape of the wedge lugs.

As shown in the drawings, an automobile wheel comprises a hub 3, spokes 4, a felly 5 and a felly band 6. A rim 7 for a pneumatic tire 8 is of greater width than the wheel felly. The felly band 6 is of substantially the same width as the wheel felly. The dotted line A—A of Fig. 2 represents the middle plane of the wheel and felly band 6. It will be noted that the felly band is symmetrical as to such plane and has a cylindrical inner periphery which fits the wheel felly. The band 6 therefore has no flange or flanges, is of most simple form and may be easily placed on the felly. The rim 7 is unlike the rims commonly used in the past in so far as it is split or divided transversely at one point 7' in its circumference. The ends of the rim are secured by a plate (9) and projections (9ª) and a threaded member (9ᵇ) and nut (9ᶜ), said member (9ᵇ) passing through the wheel felly. A driving connection is thus formed between the wheel and rim to prevent relative rotation thereof. This construction of the rim facilitates the placing of the rim within a tire 8 and also facilitates the removal of the rim from the tire. The rim as shown is of greater circumference than the wheel felly so that it may be easily slipped into and taken off the wheel along with the tire 8. For supporting, centering and clamping the rim upon the wheel, in the absence of an annular flange on the felly, I employ a plurality of clamping and wedging lug devices. Two of these devices are arranged on opposite sides of the wheel at other points, as well shown in Fig. 1. Each said device consists primarily of two opposed wedge lugs 10 and 11 and a straight threaded bolt 12. This bolt extends through the felly just beneath the felly band and joins said lugs. Each lug is characterized by a wedge portion 13—14 and a shank portion 15. These shank portions parallel respective sides of the felly and are joined by the clamping bolt. Each wedge lug presents a pointed or thin inner end 14 and a thicker outer end or clamping part 13. The opposite wedges are non-contacting; that is neither is long enough to reach the other across the periphery of the wheel. The inner wedge lug 10 is preferably secured and stationary on the wheel felly whereas the outer wedge lug is movable and when loosened may be moved out of the way of rim to permit the removal and replacement of the latter. It will be clear that when the bolt is tightened upon the wedge lugs, as represented in Fig. 2, the rim will be tightly bound between the opposed wedges. When all the bolts are thus tightened to drive the wedges home the rim is placed under tension and thus firmly bound upon the tops or outer surfaces of the wedges. An incident or characteristic of binding and tensioning the rim by such means is that the rim is slightly distorted between the several clamping devices, that is the action is such as to somewhat straighten the portions of the rim circumferentially between adjacent pairs of wedges.

In practice I form a thread 15ª in the shank 15 of the lug 10 and extend said shank to form a hollow rivet 15′ which passes through the felly and is riveted on the outer side of the felly as shown at 15ᵇ. I also use a bolt 12 which is threaded in the shank of the lug 10 and has a head 12′. This lug is arranged, as by a swaged on sleeve 12ª, to forcibly withdraw the wedge lug 11 when the bolt is backed out of the threaded lug. Obviously the head 12′ of the bolt serves to forcibly drive the wedge lug home when the bolt is screwed into the felly.

I do not limit my invention to the precise construction herein shown as the substance of my invention readily may be embodied in somewhat different structures for the same purposes and perform the same functions.

Having thus described my invention I claim as new and desire to secure by Letters Patent:

1. An automobile wheel having a flangeless felly band in combination with a demountable rim thereon, a driving connection between said band and rim to prevent relative rotation thereof and a plurality of sets of clamping wedge lugs spaced around the wheel felly and adapted to secure the rim on the wheel by tensioning and circumferentially distorting the rim thereon, each said set comprising two opposed non-contacting lugs presenting clamping wedge portions between the felly band and rim and a single felly bolt for clamping the same against the rim.

2. An automobile wheel having a felly band, in combination with a demountable rim thereon, and a plurality of rim clamping devices upon and spaced about the wheel felly, each thereof comprising two opposed non-contacting wedges, both normally positioned between and contacting both said rim and band and having shanks paralleling the sides of the wheel felly, and a headed clamping bolt passing through said shanks and through the wheel felly beneath said band for closing said wedges against the rim to tension and circumferentially distort the same and thus secure it upon the wheel.

3. An automobile wheel having a felly band of symmetrical cross section and cylindrical inner periphery, in combination with a demountable rim thereon, and a plurality of rim clamping devices upon and spaced about the wheel felly, each thereof comprising two opposed non-contacting wedge lugs presenting pointed wedges between said rim and band, and a straight clamping bolt passing through said lugs for closing said wedges upon said band and against said rim to secure it upon said wheel.

4. An automobile wheel having a felly band, in combination with a demountable rim thereon, and a plurality of rim clamping devices upon and spaced about the wheel felly, each thereof comprising two opposed non-contacting wedge lugs having clamping wedge portions normally positioned between said rim and band and also having shanks paralleling the sides of the wheel felly, one said lug being fixed against the inner side of the wheel felly and the other being movable toward and from the front or outer side of said felly, and a headed clamping bolt passing through said shanks and through the wheel felly beneath said band, for closing said wedges against the rim to tension and circumferentially distort the same and thus secure it upon the wheel.

5. An automobile wheel having a felly band, in combination with a demountable rim thereon, and a plurality of rim clamping devices upon and spaced about the wheel felly, each thereof comprising two opposed non-contacting wedge lugs having clamping wedge portions presented between said rim and band and also having shanks at the sides of the wheel felly, the wedge lug on the outer side of the felly being movable toward and from the same, and a headed felly bolt passing through said shanks adapted to move the outer lug in both directions, whereby the wedge lugs may be closed against the rim to tension and circumferentially distort the same and thus secure it upon the wheel.

In testimony whereof, I have hereunto set my hand, this 12th day of March, 1912, in the presence of two subscribing witnesses.

ERLE K. BAKER.

Witnesses:
EDWARD F. WILSON,
JOHN R. LEFEVRE.

Copies of this patent may be obtained for five cents each, by addressing the "Commissioner of Patents, Washington, D. C."